W. INGLEDUE.
HAY RAKE AND LOADER.
No. 193,000. Patented July 10, 1877.
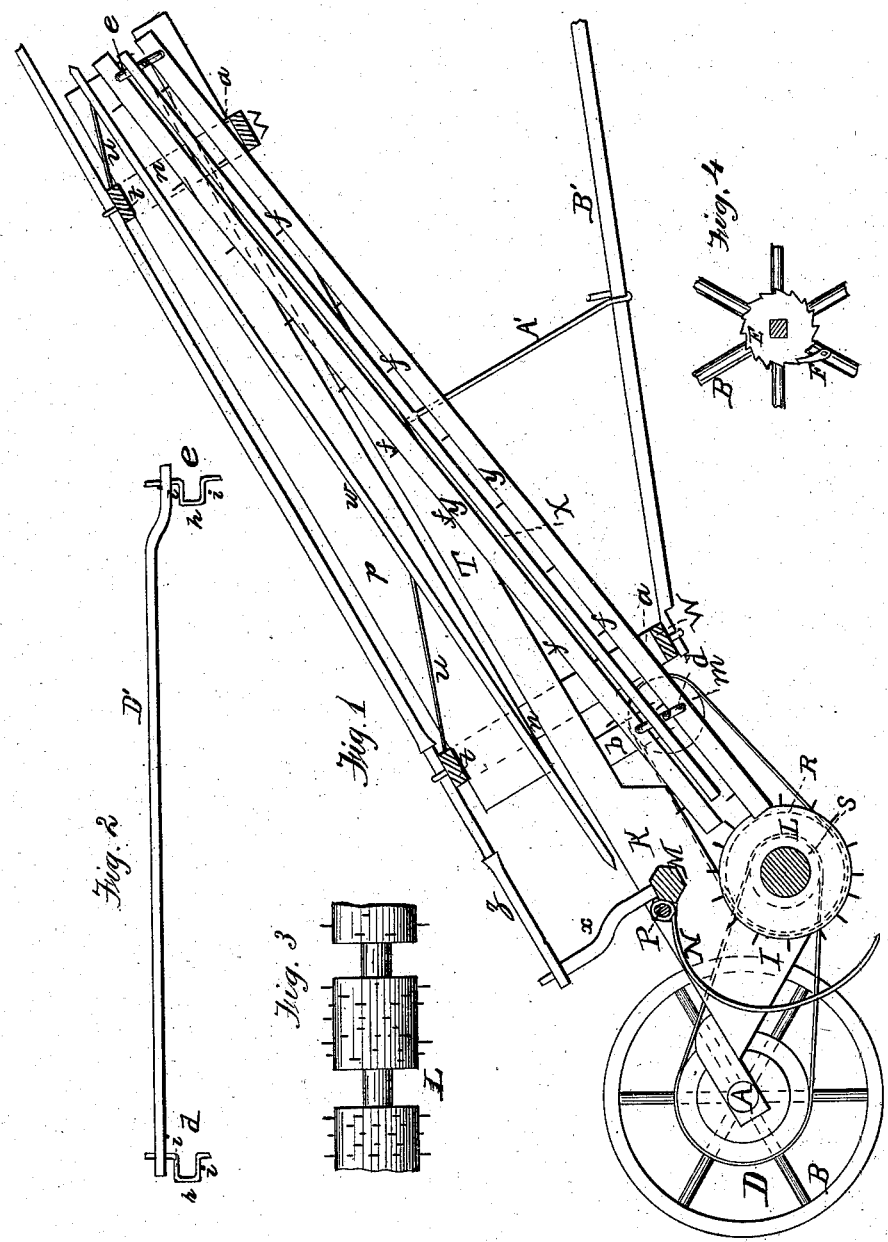

UNITED STATES PATENT OFFICE.

WILLIAM INGLEDUE, OF MARSHALLTOWN, IOWA.

IMPROVEMENT IN HAY RAKE AND LOADER.

Specification forming part of Letters Patent No. 193,000, dated July 10, 1877; application filed May 21, 1877.

*To all whom it may concern:*

Be it known that I, WILLIAM INGLEDUE, of Marshalltown, in the county of Marshall and State of Iowa, have invented a new and useful Improvement in Hay Rakes and Loaders, of which the following is a specification, reference being had to the accompanying drawings.

The invention relates to an improvement in combined hay rakes and loaders; and consists in the devices hereinafter specifically described, the object being to furnish a suitable means for gathering grain and elevating it to the rear end of a wagon.

Referring to the accompanying drawings, Figure 1 is a central vertical longitudinal section of a device embodying the elements of the invention. Fig. 2 is a detached view of bar D'. Fig. 3 is a like view of the picker-roller, and Fig. 4 is a broken view of the wheel B with the pawl and ratchet attached.

In the accompanying drawings, A represents the main axle of the machine, which axle is furnished, on either end, with the loosely-mounted wheels B, for conveying the device, and with the rigidly-secured wheels D, upon the outer side of which the ratchets E are formed. The pawls F are pivoted upon the inside faces of the wheels B in juxtaposition to the ratchets E, and are furnished with suitable springs to give them a downward tension upon the said ratchet.

At a proper distance in front of the axle A is mounted, in the elevator-frame K, the rake-head M, in which is inserted and secured one end of the rake-teeth N, which are wound around the bar P, near the rake-head, and then curve rearward and downward a suitable distance to insure an effective operation.

In the lower portion of the lugs I of the elevator-frame K is journaled the picker-roller L, which is reduced, at regular intervals, as shown, to permit the working of the elevator, and is provided, on its periphery, with pins or teeth for clearing the hay of trash, and then conveying the said hay from the teeth N to the arms of the elevator.

Upon one end of the picker-roller L is secured the band-wheel R, upon the side of which is formed a smaller wheel, S, of similar construction, the purpose of which will be mentioned hereinafter.

The elevator-frame K is composed of the side stretchers T, braces W, and inclined slats X, which are spaced, as shown, to permit the working of the arms Y between them, and are sustained on blocks a, secured upon the upper surface of the said braces.

In the lugs b of the frame K is secured the crank-shaft d, which extends transversely across the machine, and is provided with double cranks in the spaces between the slats X. This shaft corresponds exactly with the shaft e, mounted in the front end of the elevator-frame, and is connected therewith by the arms Y, which are provided, on their upper surfaces, with teeth f.

The transverse arms of the double cranks of the shafts d e point in opposite directions— that is to say, the parts h trend in one and the parts i in just the contrary direction.

There are two arms, Y, placed in each space between the slats X—one on the parts h of the shafts d e, and the other on the parts i, so that in the operation of the device one arm will be carried forward and downward, while the other is being passed rearward and upward. Thus the arms are alternately elevated, moved forward, and depressed. It is evident, therefore, that when the hay is thrown upon these arms by the picker-roller L it will be carried forward by, first, one series of arms, and then the other, until it reaches the top of the elevator and falls upon the wagon, to which the machine is attached.

Upon one end of the shaft d is secured the belt-wheel m, which is connected with the wheel R by a chain-belt, whereby motion is communicated from one wheel to the other. The wheel D is connected with the wheel S by a chain-belt, and it is by this means that power is imparted from the wheels B, through the wheels D S, to the wheels m R, and through these to the roller L, shafts d e, and arms Y.

The standards n are secured to the sides of the frame K, and are provided, on their sides, with the guards p, and at their upper ends with the cross-bars t, which are furnished with the inclined depending springs u, to the lower ends of which are secured the slats or bars w. These are provided, in connection with the guards p, to prevent wind blowing the hay from the machine while being elevated.

About the center of the rake-head M is provided the standard x, which extends upward, and is connected with the rod z, which passes forward in guides secured on the cross-bars t, and is employed to adjust the rake upon any desired angle.

Upon the lower surface of the frame K is secured the bail A', which receives and sustains the central parts of the rod B', its rear end being fastened to the rear brace W. The purpose of the said rod is to couple the machine with the wagon upon which the hay is to be elevated.

The rod D' connects the shafts d e at one side of the machine, and can be used to free the arms Y of straw or hay after the motive-power imparted by the wheels B has ceased to exist.

By means of the pawls F and ratchets E the rotation of the wheels B causes the axle A to revolve while the device is being carried forward, and thereby sets the mechanism in motion, but when pushed rearward the pawls will slide over the ratchets and permit the axle and gearing to remain at rest.

The grain is gathered by the teeth N, thrown by the roller L on the arms Y, which convey it upward to the wagon and deposit it thereon.

What I claim as my invention, and desire to secure by Letters Patent, is—

1. The axle A, provided with wheels B, pawls F, ratchets E, and band-wheel D, in combination with the wheel S, picker-roller L having depressions, and arms Y, substantially as set forth.

2. A horizontal picker-roller, I, provided with depressions, in combination with the wheel m, crank-shafts d e, and arms Y, substantially as specified.

3. The shafts d e and arms Y, in combination with the picker-roller I, provided with depressions to receive the ends of the arms, substantially as shown and described.

In testimony that I claim the foregoing improvement in hay rakes and loaders, as above described, I have hereunto set my hand this 7th day of May, 1877.

WILLIAM INGLEDUE.

Witnesses:
   JOEL S. EDWARDS,
   J. C. WYLLIS.